May 23, 1967 R. A. KAENEL 3,321,719

APPARATUS FACILITATING ADJUSTMENT OF EQUALIZERS

Filed Dec. 21, 1962

INVENTOR
R. A. KAENEL
BY [signature]
ATTORNEY

United States Patent Office 3,321,719
Patented May 23, 1967

3,321,719

APPARATUS FACILITATING ADJUSTMENT OF EQUALIZERS

Reginald A. Kaenel, Bethesda, Md., assignor to Bell Telephone Laboratories, Incorporated, New York, N.Y., a corporation of New York Filed Dec. 21, 1962, Ser. No. 246,377
8 Claims. (Cl. 333—28)

This invention relates to transmission equalizers and, more particularly, to a method and circuit arrangement for accomplishing systematic, iterative adjustment of equalizers employing transversal filters.

The transversal filter, frequently employed to equalize the characteristics of transmission lines, is constructed of the uniform delay line tapped periodically along its length. The taps are all joined together to constitute the filter output. The settings of multipliers connected between each tap and the filter output determine the transmission characteristics of the filter. Because each of the many multipliers is independently set, the transversal filter is capable of adjustment to provide a wide range of transmission characteristics, and thus proves to be a versatile equalizer. Concomitant to the versatility of the transversal filter and stemming from the many independently adjustable multipliers is the difficulty in any particular case of arriving at the multiplier settings that result in an equalized transmission facility. Frequently, resort is had to complicated nonsystematic oscilloscope techniques. When visual inspection by human operator indicates that the oscilloscope trace of a test signal passed through the system including the equalizer is identical to the wave form of the original test signal, the system is considered to be equalized.

This drawback to use of the transversal filter to equalize transmission lines is nowhere more apparent than in the milieu of a standard telephone system that meets the requirements for voice transmission but is on occasion to be used to transmit high speed digital or analog data. During such application of the telephone plant, it would be desirable to increase the channel capacity of the existing telephone lines to boost the speed of data transmission. An equalizer can increase the channel capacity and a transversal filter, due to its versatility, is particularly suited to equalize the wide variety of transmission characteristics that exist in telephone lines. It would not be practical, however, to provide an equalizer for each telephone line that might be employed for data transmission. More efficient utilization of equipment can be obtained by use of a pool of equalizers any of which may be associated with any one of many transmission lines called into operation for data transmission. However, the time expended to adjust a transversal filter equalizer by known techniques each time data transmission is to take place offsets to a large extent the beneficial effect of reduced message transmission time resulting from equalization, because the telephone line is tied up while the equalizer is being adjusted. Moreover, the operator skill necessary for carrying out the adjustment procedure increases the personnel overhead associated with data transmission.

It is therefore the object of the present invention to facilitate, both as to time and operator skill, adjustment of equalizers, particularly transversal filter equalizers.

In accordance with the above object, an equalizer to be adjusted is inserted in the transmission path of a communication facility that is to be equalized. A periodic test signal is applied to the input of the transmission path. An automatic gain control loop maintains the average power of the test signal at the output of the transmission path constant during adjustment of the equalizer. A filter having an impulse response that is the time reverse of the pulse wave form desired at the output of a transmission path is connected in tandem with the output of the transmission path. This filter performs the convolution of the desired pulse wave form and the actual pulse wave form at the output of the transmission path, and the output thereof accordingly is the crosscorrelation coefficient of these two quantities. When during adjustment of the equalizer the peak value of the crosscorrelation coefficient is maximum under the condition of constant power being applied to the filter, the desired pulse wave form and the actual pulse wave form at the output of the transmission path are closest alike in shape. Thus, the system is equalized. The state of maximum peak value of the crosscorrelation coefficient is easily detectable by a simple voltmeter connected across the output of the filter.

In the special case in which a maximally flat transmission characteristic is desired of the transmission path, no filter is employed. The peak value of the transmission path output, under constant power conditions, is directly detected. When a maximum value is attained, a maximally flat characteristic exists. Under this condition, equalization occurs when the equalizer is adjusted so that the peak value of the test signal appearing at the equalizer output is a maximum, which can be measured by a simple indicator such as a voltmeter.

According to another feature of the invention, a transversal filter equalizer is adjusted by setting each multiplier in turn to a multiplication factor that results in a peak value indication, as described above. This procedure provides a direct, iterative approach to a condition of equalization.

These and other features will become evident from the following detailed description considered in conjunction with the drawings in which.

Figures 1, 2, 3, 4A, 4B, 5:
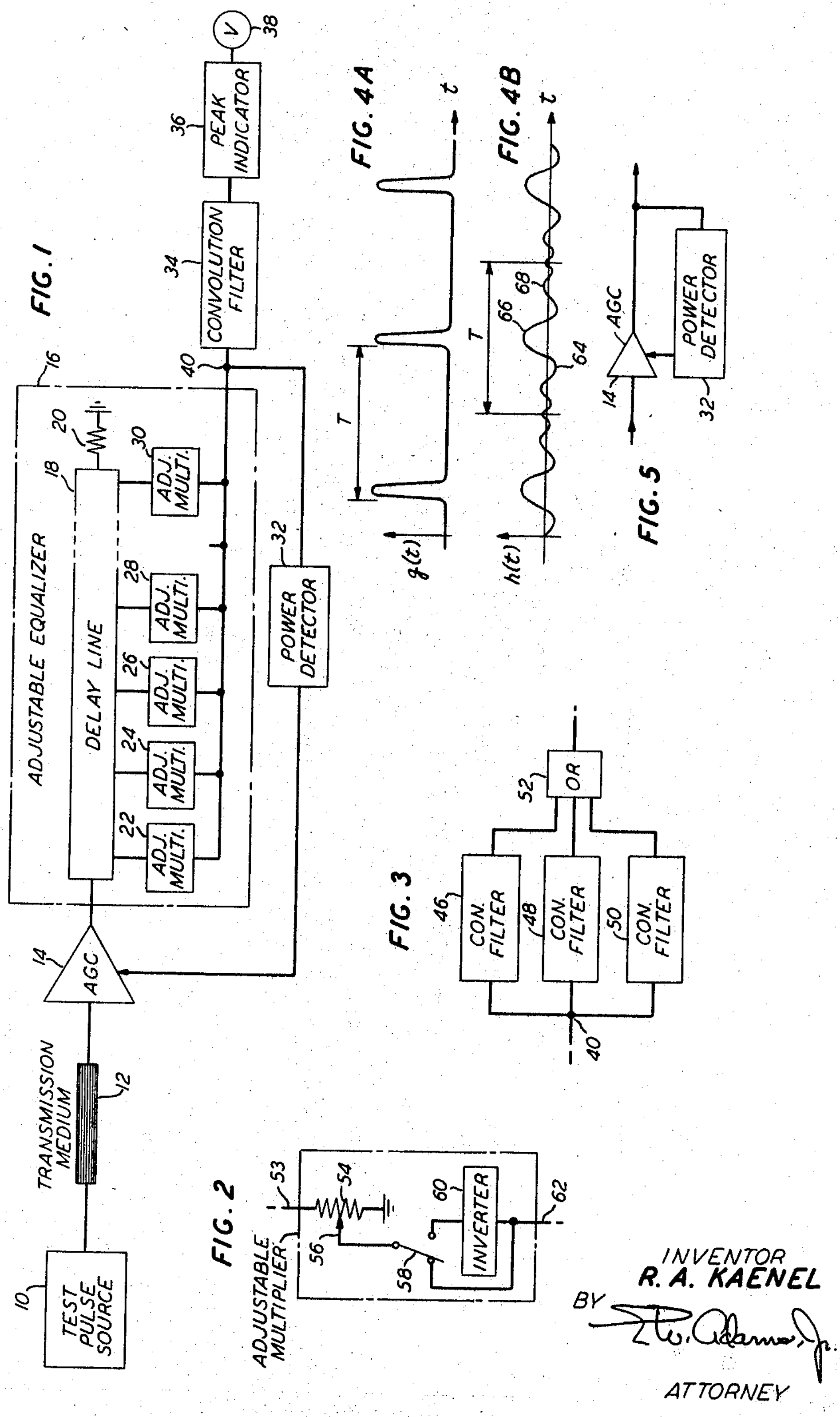
FIG. 1 is a schematic diagram in block form of a system including an equalizer adjustable according to the invention.
FIG. 2 is a schematic diagram of an adjustable multiplier of the type employed in FIG. 1.
FIG. 3 is a schematic diagram in block form of an alternative to the single convolution filter of FIG. 1.
FIGS. 4A and 4B are graphs of functions, which are helpful in comprehending the mode of operation of the invention.
FIG. 5 is a schematic diagram in block form of an alternative to the automatic gain control circuit arrangement of FIG. 1.

In FIG. 1, a test pulse source 10 applies pulses periodically to the input of a transmission medium 12 for which equalization is to be provided. FIG. 4A depicts a wave form representative of the output produced by source 10. The frequency of occurrence of the pulses is 1/T cycles per second and the duration of each pulse is small relative to the period between pulses T, thus simulating an impulse wave form. After passage through transmission medium 12, the test pulses as modified by the characteristics of the medium are applied to an automatic gain control amplifier 14. The amplified pulses are applied to an adjustable equalizer 16, which takes the form of a transversal filter. The equalizier includes a delay line 18, terminated in its characteristic impedance by a resistor 20. Adjustable multipliers, some of which are shown labeled 22, 24, 26, 28, and 30, are connected to leads tapping delay line 18 at intervals of delay less than the reciprocal of twice the highest frequency component present in the signal to be accommodated by the system, and their outputs are connected to a common node 40. FIG. 4B shows a typically distorted wave form resulting at the input to equalizer 16 from passage of the wave form of FIG. 1 through transmission medium 12.

Adjustable multipliers 22, 24, 26, 28, and 30 can each be constructed as shown in FIG. 2. It is well known that transversal filter multipliers must be capable of multiplying the signals tapped off of the delay line by factors ranging from plus one to minus one. An input lead 53 to the multiplier, tapped from delay line 18, is connected to one end terminal of a potentiometer 54, the other end terminal being connected to ground. A movable arm 56 varies the multiplication factor between one when arm 56 is at lead 53 and zero when arm 56 is at ground. The state of a switch 58 fixes the sign of the multiplication factor. With the armature of switch 58 in the left-hand position as shown, an output is made available on a lead 62 which is in phase with the input applied on lead 53 and positive multiplication factors result. With the armature of switch 58 in the right-hand position, the signal appearing on output lead 62 is shifted in phase by 180 degrees with respect to the input applied on lead 53, by virtue of an inverter 60, and negative multiplication factors result. Output lead 62 is connected to node 40 (FIG. 1).

Equalization by a transversal filter may be viewed in the time domain as a reconstruction at the filter output of the desired wave form in FIG. 4A from the distorted wave form, represented by FIG. 4B, in the following manner. A tail or distortion component 64 in FIG. 4B, for example, is advanced in phase with respect to a main lobe 66 by delay line 18 and attenuated and inverted in polarity by the multipliers to combine additively with, and increase, main lobe 66. Similarly, a tail 68 is retarded in phase with respect to main lobe 66, attenuated, and added to main lobe 66 without polarity inversion. It can be seen that when multipliers 22, 24, 26, 28, and 30 are set to equalize the system all the tails of the wave form of FIG. 4B produced during passage through transmission medium 12 are combined to coincide and agree in polarity with main lobe 66, adding to the peak height and reducing the duration of main lobe 66 until ultimately the desired wave form results.

The power combining at node 40 is sensed by a power detector 32 that controls the gain introduced by amplifier 14 to maintain constant power at node 40 while the equalizer is adjusted. An alternative arrangement of AGC amplifier 14 and power detector 32 to that shown in FIG. 1 is depicted in FIG. 5. In this case, AGC amplifier 14 is located at the output of equalizer 16. Power detector 32 can, for example, be a heater-type thermistor with the heater connected to node 40 and the thermistor shunted across the input of amplifier 14. As the power at node 40 increases, the heater raises the temperature of the thermistor, reducing its resistivity and diverting power from the input of amplifier 14. Such a gain control circuit is described on pages 723 and 724 of an article, entitled, "Thermistors," by Becker, Green and Pearson, appearing in the Transactions of Electrical Engineering, Volume 65, November, 1946.

The signal appearing at node 40 is applied to a filter 34, labeled "convolution filter" to indicate its function, having an impulse time response that is the time reverse of the desired pulse wave form at node 40. Filter 34 is designed to produce this impulse response by conventional network synthesis procedures. The output of convolution filter 34 is coupled to a peak indicator 36, the function of which is to produce a direct-current voltage proportional to the peak value of the output of filter 34. Peak indicator 36 can, for example, take the form of a diode and capacitor connected in series, with the desired direct-current voltage appearing across the capacitor. A voltmeter 38 indicates visually the value of signal peaks at the output of filter 34.

Electrical signals can be treated as vectors whose components are the elements of matrices representing the signals in the time domain. (See for an example of such treatment chapter 10 of "Lectures on Communication System Theory," E. J. Baghdady, McGraw-Hill Book Co., Inc., 1961). In this system of notation, the convolution integral of the actual pulse wave form and the desired pulse wave form, i.e., the crosscorrelation coefficient of these two quantities, can formally be represented by the dot product $$\overrightarrow{[A\cdot C]}\cdot\vec{B}=|A\cdot C|\cdot|B|\cdot\cos\Delta\Phi \qquad (1)$$

where A represents the pulse wave form at the input to adjustable equalizer 16, $\overrightarrow{[A\cdot C]}$ is the vector representing the pulse wave form actually appearing at node 40, $\vec{B}$ is the vector representing the pulse wave form desired at node 40 and $\Delta\Phi$ is formally the angle between the vector $\overrightarrow{[A\cdot C]}$ and the vector $\vec{B}$. As equalizer 16 is adjusted the transformation matrix C varies. But the absolute value $|\overrightarrow{A\cdot C}|$ remains constant because of the operation of the power control circuitry. Since the absolute value of desired pulse wave form $|B|$ will remain constant, the only quantity on the left side of expression (1) that varies is the angle $\Delta\Phi$. When expression (1) is maximum, under these conditions, the angle $\Delta\Phi$ is zero or at least a minimum. The physical significance of the angle $\Delta\Phi$ being zero is that the actual pulse wave form and the desired pulse wave form are alike in shape.

The output of filter 34 as a function of its input in the above form of notation is $$\overrightarrow{[A\cdot C]}\cdot\vec{K} \qquad (2)$$

where $\overrightarrow{[A\cdot C]}$ is as previously defined and $\vec{K}$ is the vector representing the inverse of the impulse time response of filter 34. Thus, application of the signal at node 40 to filter 34, designed to have an impulse time response that is the inverse of the desired pulse wave form at node 40, produces the crosscorrelection coefficient of the actual pulse wave form and the desired pulse wave form at the output of filter 34. When a condition of equalization as determined by filter 34 exists, voltmeter 38 registers a maximum reading of peak value of crosscorrelation coefficient.

If a maximally flat transmission characteristic is the aim of equalization, convolution filter 34 can be dispensed with. The signal at node 40 is applied directly to peak indicator 36 in this case. The transmission characteristic of the signal path between node 40 and peak indicator, which would normally have a wide pass band, then serves as filter 34.

The equalizer is adjusted by varying one multiplier at a time, starting with, for example, multiplier 22, through its range of multiplication factors and at the same time observing the reading on voltmeter 38. When voltmeter 38 indicates a maximum reading, multiplier 22 is properly adjusted. This procedure is repeated with each multiplier in turn. After each multiplier is adjusted once, a more exact adjustment can be achieved by repeating the procedure one or more times. Throughout the adjustment procedure, the system monotonically converges upon the condition of optimum equalization.

As an alternative to peak indicator 36 a pulse generator synchronized to the fundamental frequency component of the test pulse signal could be used to control a sampling circuit connected to the output of filter 34. The average value of the samples is then sensed by voltmeter 38.

It might be desirable to adjust equalizer 16 under a broader set of test conditions by generating a test signal comprising different wave forms in adjacent pulse slots. In this case, test pulse source 10 could comprise three oscillators each with a repetition rate of $1/3T$. The pulse peaks of the oscillator outputs are displaced in phase by 120 degrees from one another and combined through an OR gate. FIG. 3 shows a modification of the circuit of FIG. 1 for this situation. Filters 46, 48, and 50 are designed to simulate the frequency spectrum of different ones of the pulse wave forms. The outputs of filters 46, 48, and 50 are applied to an OR gate 52 which combines the contributions therefrom.

Although a transversal filter equalizer has been disclosed, the method and circuitry described can be utilized to adjust any type of variable equalizer. The transversal filter was chosen to illustrate the principles of the invention because the problem of its adjustment is so acute. Moreover, different component arrangements are possible. For example, pre-equalization could be practiced. In this case, equalizer 16 would be situated at the sending end of the system between source 10 and medium 12. The power control circuitry shown in FIG. 5, filter 34, peak indicator 36, and voltmeter 38 would remain at the receiving end of medium 12.

What is claimed is:

1. In a transmission system, a sending point and a receiving point linked by a transmission facility to be equalized, an adjustable equalizer situated in the transmission path between said sending point and said receiving point, a source of periodic test signals applied to said medium at said sending point, means for maintaining the power level of said test signal at said receiving point constant, means for deriving the crosscorrelation coefficient of the actual test signal wave form at said receiving point and the test signal wave form desired at said receiving point, and means for measuring the value of the peaks of said crosscorrelation coefficient.

2. In a transmission system, a sending point and a receiving point linked by a transmission facility to be equalized, an adjustable equalizer situated in the transmission path between said sending point and said receiving point, a source of periodic test signals applied to said medium at said sending point, means for maintaining the power level of said test signal at said receiving point constant, and means for indicating the value of the peaks of said constant power test signal at said receiving point.

3. In a transmission system, a sending point and a receiving point linked by a transmission facility to be equalized, an adjustable equalizer situated in the transmission path between said sending point and said receiving point, a source of test signals applied to said medium at said sending point, means for maintaining the power level of said test signal at said receiving point constant, means for deriving the crosscorrelation coefficient of the actual test signal wave form at said receiving point and the desired test signal wave form at said receiving point, and means indicating when during adjustment of said equalizer the valve of said crosscorrelation coefficient is a maximum.

4. Apparatus as defined in claim 1 in which said adjustable equalizer is a transversal filter having taps placed along its length at intervals of transmission delay time less than the reciprocal of twice the highest frequency component to be sent over said transmission medium, and variable signal multipliers connected to each of said taps, the outputs of said multipliers being connected to a common point consituting the output of said filter.

5. Equipment for adjusting a variable equalizer to compensate the characteristics of a transmission medium comprising a variable equalizer to be connected to the output of said medium, means for detecting the power level at the output of said equalizer, means responsive to said detecting means for adjusting the power level at the input of said equalizer to counteract changes in power level occurring at the output of said equalizer, a filter having an impulse response that is the time reverse of the wave form desired at the output of said equalizer, a peak detector connected to the output of said filter, and means for indicating the value of the output of said peak detector.

6. Equipment for adjusting a variable equalizer to compensate the characteristics of a transmission medium comprising a variable equalizer to be connected to the output of said medium, means for detecting the power level at the output of said equalizer, means responsive to said detecting means for adjusting the power level at the input of said equalizer to counteract changes in power level occurring at the output of said equalizer, a peak detector connected to the output of said equalizer, and means for indicating the value of the output of said peak detector.

7. Equipment for adjusting a variable equalizer to compensate the charactteristics of a transmission medium comprising a source of test signals to be coupled to the input of said medium, a variable equalizer to be connected to the output of said medium, means for maintaining a constant power level at the output of said equalizer, a filter having an impulse time response which simulates the time reverse of the wave form desired at the output of said equalizer connected to the output of said equalizer, and means for determining when the peak output from said filter is maximum.

8. Apparatus as defined in claim 5 in which said variable equalizer is a transversal filter having a uniform delay line, means for tapping the signals appearing on said delay line at intervals of transmission delay time less than the reciprocal of twice the highest frequency component applied to said filter, adjustable means for multiplying each of the signals abstracted by said tapping means by quantities within the range of plus or minus one, and means for combining all of said multiplied signals to constitute the output of said filter.

References Cited by the Examiner

UNITED STATES PATENTS

| | | | |
|---|---|---|---|
| 2,478,778 | 8/1949 | Oliver | 333—18 |
| 2,719,270 | 9/1955 | Ketchledge | 333—16 |
| 2,855,573 | 10/1958 | Fredenall | 333—73 |
| 2,908,873 | 10/1959 | Bogert | 333—18 |
| 2,908,874 | 10/1959 | Pierce | 333—18 |
| 2,954,465 | 9/1960 | White | 333—70 |
| 2,960,571 | 11/1960 | Malthaner | 178—69 |
| 2,961,535 | 11/1960 | Lanning | 328—55 |

HERMAN KARL SAALBACH, *Primary Examiner.*

C. B. BARAFF, *Assistant Examiner.*